US007774707B2

(12) United States Patent

Sim et al.

(10) Patent No.: US 7,774,707 B2
(45) Date of Patent: Aug. 10, 2010

(54) METHOD AND APPARATUS FOR ENABLING A USER TO AMEND AN AUDIO FILE

(75) Inventors: Wong Hoo Sim, Singapore (SG); Peng Kiat Phneah, Singapore (SG); Kok Hoong Cheng, Singapore (SG); Chia Fong Choo, Singapore (SG); Michael Lee, Palo Alto, CA (US)

(73) Assignee: Creative Technology Ltd, Singapore (SG)

( * ) Notice: Subject to any disclaimer, the term of this patent is extended or adjusted under 35 U.S.C. 154(b) by 1006 days.

(21) Appl. No.: 10/907,989

(22) Filed: Apr. 22, 2005

(65) Prior Publication Data

US 2006/0117261 A1 Jun. 1, 2006

Related U.S. Application Data

(60) Provisional application No. 60/632,360, filed on Dec. 1, 2004.

(51) Int. Cl.
*G06F 3/00* (2006.01)

(52) U.S. Cl. ...................................................... 715/727

(58) Field of Classification Search ....................... None
See application file for complete search history.

(56) References Cited

U.S. PATENT DOCUMENTS 5,046,097 A 9/1991 Lowe et al.
5,107,746 A * 4/1992 Bauer .......................... 84/626
5,208,860 A 5/1993 Lowe
5,212,733 A 5/1993 DeVitt et al.
5,636,283 A 6/1997 Hill et al.
5,715,318 A 2/1998 Hill (Continued)

FOREIGN PATENT DOCUMENTS

EP 1061655 12/2000

OTHER PUBLICATIONS

Humon, Naut et al , Sound Traffic Control: An Interactive 3-D Audio System for Live Musical Performance, ICAD, 1998, 1-8.*

(Continued)

*Primary Examiner*—Boris Pesin
*Assistant Examiner*—Ryan F Pitaro

(57) ABSTRACT

There is a provided a method and apparatus for enabling a user to amend an audio file, via a user interface for controlling a driver for re-authoring the audio file. The method comprises the following steps: a) associating an icon on said user interface with one or more instruments or sets of instruments in said audio file; b) providing a selection of possible trajectories for each said icon, each trajectory defining the virtual path, relative to said user, of the associated instrument or set of instruments; c) providing a display on said user interface for showing the position of each said icon, each position defining the virtual position, relative to said user, of the associated instrument or set of instruments; d) the user selecting an icon; e) the user assigning a position and/or a trajectory from the selection, to the selected icon; and g) indicating, on said display, the position of the selected icon and whether a trajectory has been assigned to the selected icon. The invention relates in particular to a method for enabling a user to amend a MIDI file, via a user interface for controlling a driver for applying three-dimensional audio data to the MIDI file.

21 Claims, 6 Drawing Sheets

U.S. PATENT DOCUMENTS

| | | | | |
|---|---|---|---|---|
| 5,724,605 | A * | 3/1998 | Wissner | 715/202 |
| 5,812,688 | A | 9/1998 | Gibson | |
| 5,850,455 | A * | 12/1998 | Arnold et al. | 381/17 |
| 5,918,223 | A * | 6/1999 | Blum et al. | 707/1 |
| 5,977,471 | A * | 11/1999 | Rosenzweig | 84/633 |
| 6,140,565 | A * | 10/2000 | Yamauchi et al. | 84/600 |
| 6,245,982 | B1 * | 6/2001 | Suzuki et al. | 84/477 R |
| 6,490,359 | B1 * | 12/2002 | Gibson | 381/119 |
| 6,757,573 | B1 | 6/2004 | Ledoux | |
| 6,867,361 | B2 * | 3/2005 | Nishitani et al. | 84/658 |
| 7,285,715 | B2 * | 10/2007 | Sasaki et al. | 84/737 |
| 7,462,772 | B2 * | 12/2008 | Salter | 84/477 R |
| 7,589,727 | B2 * | 9/2009 | Haeker | 345/440 |
| 2002/0103553 | A1 | 8/2002 | Phillips | |
| 2003/0007648 | A1 | 1/2003 | Currell | |
| 2005/0078182 | A1 * | 4/2005 | Lipsky et al. | 348/143 |
| 2006/0101983 | A1 * | 5/2006 | Boxer | 84/484 |

OTHER PUBLICATIONS

The Sonic Spot: Spin Audio Releases 3D Planner Studio, Feb. 22, 2001, 2 pages, http://www.sonicspot.com/news/01022201.html.

3D Panner Studio Manual, Revision 02, Aug. 22, 2001, 12 pages.

* cited by examiner

METHOD AND APPARATUS FOR ENABLING A USER TO AMEND AN AUDIO FILE

This application claims the benefit of U.S. Provisional Application No. 60/632,360, filed on Dec. 1, 2004, the entire specification of which is incorporated herein by reference in its entirety.

FIELD OF THE INVENTION

The invention relates to a method and apparatus for enabling a user to amend an audio file, via a user interface for controlling a driver for re-authoring the audio file. Particularly, but not exclusively, the invention relates to a method and apparatus for enabling a user to amend a MIDI file, via a user interface for controlling a driver for applying three-dimensional audio data to the MIDI file.

BACKGROUND OF THE INVENTION

Many individual users download and listen to music, in the form of MIDI files, on their own PC. However, users are becoming more sophisticated and are requiring improved soundscapes for MIDI files. In addition, users want to be able to personalise MIDI files for improved listening, for example by amending the MIDI file soundscape and saving their own changes.

Two dimensional audio data is known for various audio files. If two dimensional audio data is applied to a file, the sound does not emanate from a fixed location but is made to change location periodically or emanate from a moving location. However, there is, as yet, no convenient way for a user to amend a MIDI file with two dimensional or three dimensional audio data.

SUMMARY OF THE INVENTION

In general terms, the invention proposes that a user interface be provided for controlling a driver for re-authoring an audio file. In that user interface, an icon is assigned to each instrument or set of instruments in the audio file. For each icon, a particular position (relative to the user) may be selected and/or a particular trajectory (relative to the user) may be selected. The particular trajectory may be selected from a selection of trajectories. The user interface shows the icons and the position of each icon relative to the user and may also show the trajectory assigned to each icon. Thus, the user is able to select a new position and/or a trajectory for an icon and, once he has done so, he can see the changes he has made on the user interface.

In particular, according to the invention, there is provided a method for enabling a user to amend an audio file, via a user interface for controlling a driver for re-authoring the audio file, the method comprising the steps of:

a) associating an icon on said user interface with one or more instruments or sets of instruments in said audio file;
b) providing a selection of possible trajectories for each said icon, each trajectory defining the virtual path, relative to said user, of the associated instrument or set of instruments;
c) providing a display on said user interface for showing the position of each said icon, each position defining the virtual position, relative to said user, of the associated instrument or set of instruments;
d) the user selecting an icon;
e) the user assigning a position and/or a trajectory from the selection, to the selected icon; and
g) indicating, on said display, the position of the selected icon and whether a trajectory has been assigned to the selected icon.

In a preferred embodiment, the display on the user interface shows a virtual view of the user and the user's surroundings. In that case, the step of indicating the position of the selected icon may comprise displaying the position of the icon in the user's immediate surroundings on the virtual view.

In one embodiment, the virtual view shows a virtual plan view of the user and a two dimensional horizontal plane around the user. In that case, the position of the icon in the two dimensional plane may be indicated by the position of the icon on the virtual plan view. The position of the icon in the vertical direction may be indicated on the virtual plan view by changing the appearance of the icon. For example, the icon may be shown with a shadow, the size of the shadow indicating the vertical position of the icon relative to the user.

In an alternative embodiment, the virtual view shows a virtual perspective view of the user and a three dimensional space around the user. In that case, the position of the icon in the space around the user may be indicated by the position of the icon on the virtual perspective view.

Alternative virtual views are also envisaged. For example, the virtual view may show a virtual elevation view of the user and a two dimensional vertical plane around the user.

Advantageously, the step of the user assigning a position to the selected icon comprises the user moving the selected icon in the user's immediate surroundings on the virtual view. This may be by clicking and dragging the selected icon across the user interface.

Preferably the method further comprises the step of showing on the user interface the instrument or instruments associated with each icon.

Preferably, the method further comprises the step of showing on the user interface the trajectory, if any, assigned to each icon. The trajectory defines a sequence of positions around the user, repeated to form a loop to continue for the duration of the complete audio file.

Preferably, the method further comprises the step of saving changes to the audio file. That step may be performed by a user or may be performed automatically, for example at regular time intervals.

In one embodiment, the instrument or instruments associated with each icon and the trajectory assigned to each icon are shown on a second display on the user interface. The second display may also display further information related to each icon. Thus, in that embodiment, there are two displays on the user interface: the first showing the position of each icon relative to the user and the second showing information related to each icon including the instrument or instruments associated with each icon and the trajectory associated with each icon.

In a preferred embodiment, the icon or icons which have been assigned a trajectory have a different visual appearance from icons which have not been assigned a trajectory. Thus, the user is able to tell at a glance which icons have been assigned a trajectory and which icons have not been assigned a trajectory.

In one embodiment, the icon or icons which have been assigned a trajectory are shown with a coloured glow. That glow may be a green glow, the color green being commonly associated with movement.

In an embodiment of the invention, the selection of possible trajectories includes one or more of: left and right motion; up and down motion; figure-of-eight motion; zig zag motion; spiral motion; and arcuate motion. Other possible trajectories are also envisaged.

In a particularly advantageous embodiment, the audio file is a MIDI file and the rhythm of the trajectory is arranged to be matched with rhythm of music of the MIDI file. In that embodiment, the method may further comprise the step of the user selecting a rhythm, from a selection, for the trajectory assigned to the selected icon.

In one embodiment, the audio file is a MIDI file.

According to the invention, there is provided apparatus for enabling a user to amend an audio file, the apparatus comprising a user interface for controlling a driver for re-authoring the audio file, the user interface comprising:

a) at least one icon, the or each icon being associated with one or more instruments or sets of instruments in said audio file;

b) a selection of possible trajectories for each icon, each trajectory defining the virtual path, relative to the user, of the associated instrument or set of instruments;

c) a display on said user interface, the display showing i) the position of each icon, each position defining the virtual position, relative to the user, of the associated instrument or set of instruments; and ii) whether a trajectory has been assigned to the selected icon.

In a preferred embodiment, the display on the user interface comprises a virtual view of the user and the user's surroundings. In that case, the display may show the position of each icon by displaying the position of the icon in the user's surroundings on the virtual view.

In one embodiment, the virtual view shows a virtual plan view of the user and a two dimensional horizontal plane around the user. In that case, the position of the icon in the two dimensional plane may be indicated by the position of the icon on the virtual plan view. The position of the icon in the vertical direction may be indicated on the virtual plan view by changing the appearance of the icon. For example, the icon may be shown with a shadow, the size of the shadow indicating the vertical position of the icon relative to the user.

In an alternative embodiment, the virtual view shows a virtual perspective view of the user and a three dimensional space around the user. In that case, the position of the icon in the space around the user may be indicated by the position of the icon on the virtual perspective view.

Alternative virtual views are also envisaged. For example, the virtual view may a show a virtual elevation view of the user and a two dimensional vertical plane around the user.

Preferably the display shows the instrument or instruments associated with each icon. Preferably, the display shows the trajectory, if any, assigned to each icon.

In a preferred embodiment, the icon or icons which have been assigned a trajectory have a different visual appearance from icons which have not been assigned a trajectory. Thus, the user is able to tell at a glance which icons have been assigned a trajectory and which icons have not been assigned a trajectory.

In one embodiment, the icon or icons which have been assigned a trajectory are shown with a colored glow. That glow may be a green glow, the color green being commonly associated with movement.

In an embodiment of the invention, the selection of possible trajectories includes one or more of: left and right motion; up and down motion; figure-of-eight motion; zig zag motion; spiral motion; and arcuate motion. Other possible trajectories are also envisaged.

According to the invention, there is also provided a method for enabling a user to amend an audio file, via a user interface for controlling a driver for re-authoring the audio file, the method comprising the steps of:

a) associating an icon on said user interface with one or more instruments or sets of instruments in said audio file;

b) providing a selection of possible trajectories for each said icon, each trajectory defining the virtual path, relative to said user, of the associated instrument or set of instruments;

c) for each trajectory, providing a selection of possible rhythms, each rhythm being matched to rhythm of music of the audio file and defining the rate of motion of the icon;

d) the user selecting an icon;

e) the user assigning a trajectory, from the selection, to the selected icon; and f) the user assigning a rhythm, from the selection, to the trajectory assigned to the selected icon.

Each rhythm defines the rate of motion of the icon for a given trajectory. Each rhythm is matched to the audio file music rhythm, thereby establishing a coordination between the audio file music and the icon trajectory.

Preferably, the method further comprises the step of showing on the user interface the instrument or instruments associated with each icon.

Preferably, the method further comprises the step of showing on the user interface the trajectory assigned to each icon.

Preferably, the method further comprises the step of showing on the user interface the rhythm assigned to the trajectory assigned to each icon.

In one embodiment, the instrument or instruments associated with each icon and the trajectory assigned to each icon and the rhythm assigned to each trajectory are shown on a display on the user interface. The display may also display further information related to each icon.

In an embodiment of the invention, the selection of possible trajectories includes one or more of: left and right motion; up and down motion; figure-of-eight motion; zig zag motion; spiral motion; and arcuate motion.

According to the invention, there is also provided apparatus for enabling a user to amend an audio file, the apparatus comprising a user interface for controlling a driver for re-authoring the audio file, the user interface comprising:

a) at least one icon, the or each icon being associated with one or more instruments or sets of instruments in said audio file;

b) a selection of possible trajectories for each icon, each trajectory defining the virtual path, relative to the user, of the associated instrument or sets of instruments;

c) a selection of possible rhythms for each trajectory, each rhythm being matched to rhythm of music of the audio file and defining the rate of motion of the icon; and d) a display on said user interface, the display showing the position of each icon, each position defining the virtual position, relative to the user, of the associated instrument or set of instruments.

According to the invention, there is also provided a method for enabling a user to amend an audio file, via a user interface for controlling a driver for re-authoring the audio file, the method comprising the steps of:

computer means associating an icon on the user interface with one or more instruments or sets of instruments in the audio file;

computer means providing a selection of possible trajectories for each icon, each trajectory defining the virtual path, relative to the user, of the associated instrument or set of instruments;

computer means providing a display on the user interface for showing the position of each icon, each position defining the virtual position, relative to the user, of the associated instrument or set of instruments;

the user selecting an icon;

the user assigning a position to the selected icon;

the user, optionally, assigning a trajectory, from the selection, to the selected icon; and computer means indicating, on the display, the position of the selected icon and whether a trajectory has been assigned to the selected icon.

It should be understood that any preferred features for one aspect of the invention may also be preferred features for any other aspect of the invention.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, of which

DETAILED DESCRIPTION OF THE PREFERRED EMBODIMENT

Figure 1:
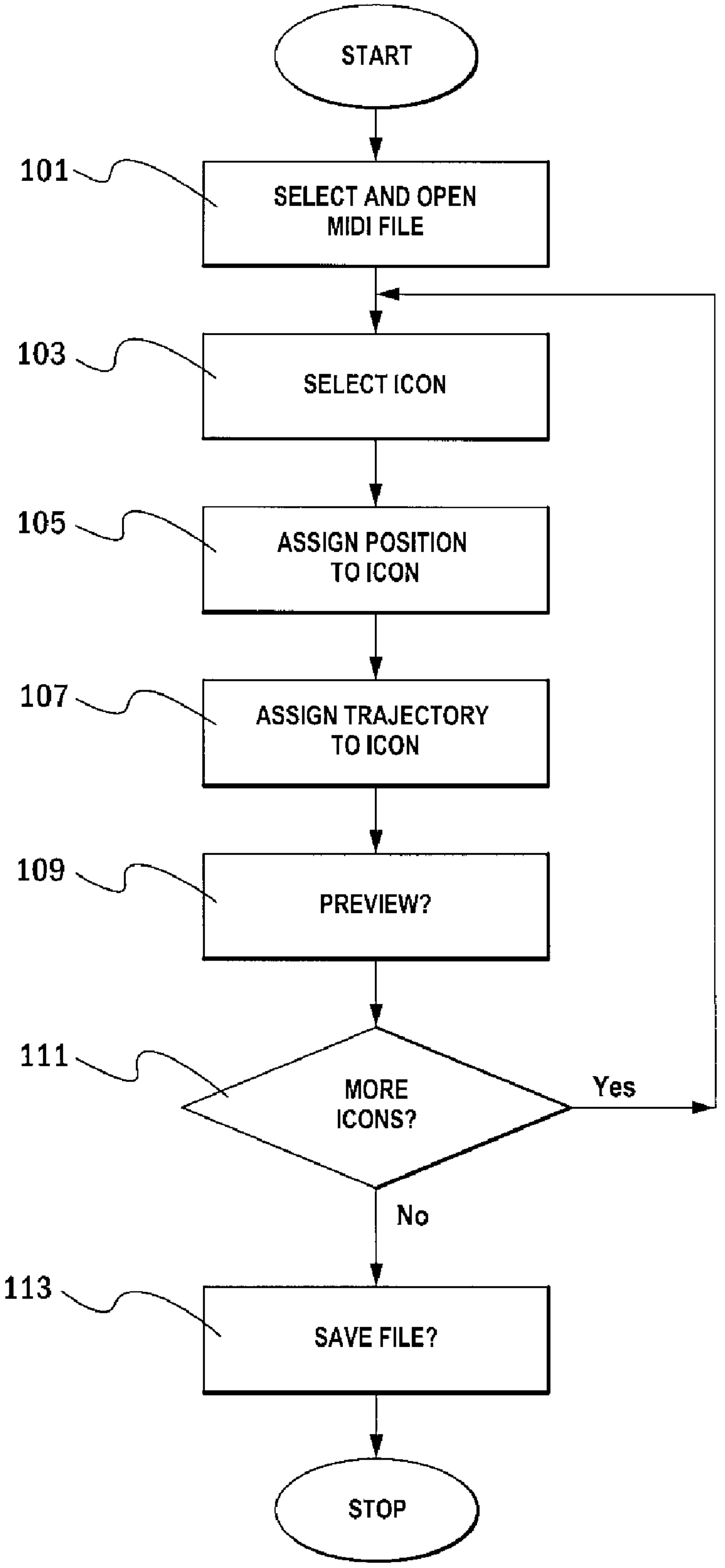
FIG. 1 is a flow diagram showing the steps a user can take to permit re-authoring of a standard MIDI file contents with 3D MIDI information.

FIG. 1 is a flow diagram showing the steps a user can take to permit re-authoring of a standard MIDI file contents with 3D MIDI information.

The logic moves from a start step to step 101 where the user selects the particular MIDI file which is to be re-authored by the application of 3D audio rendering metadata. The file is typically an un-amended MIDI file with 2D audio only.

Once the user has opened the MIDI file, at step 101, he can immediately see a selection of icons representing the instruments within that file. Each icon may represent a single instrument (e.g. a keyboard/piano) or may represent more than one instrument (e.g. a keyboard plus a guitar) or may represent a set of instruments (e.g. the strings section of an orchestra). The number of icons will depend on the number of instruments which will, in turn, depend on the particular file selected.

The icons are displayed on the user interface in such a way as to show the position of each icon with respect to the user. The position of a particular icon on the display represents the virtual position relative to the user of the instrument or instruments associated with that icon i.e. the position relative to the user, from which the sound of the particular instrument or instruments associated with that icon will emanate, when the MIDI file is played.

It will be noted that "icon position" and "instrument position" will be used interchangeably in the specification but it should be understood that "icon position" refers to the position of the icon relative to the user on the user interface, whereas "instrument position" refers to the virtual position of the instrument relative to the user. The position of the icons/instruments may be restricted to a two dimensional horizontal plane around the user. Alternatively, the icons/instruments may be positioned in the three dimensional space around the user.

At step 103, the user selects a particular icon. The selected icon is one to which the user wants to assign a new position and/or trajectory i.e. the user wants the sound of the instrument or instruments associated with the selected icon to emanate from a new location when the MIDI file is played, or wants the sound of that instrument or instruments to emanate from a non-stationary location when the MIDI file is played.

At step 105, the user assigns a position to the selected icon. This may be by moving the selected icon to a different position on the user interface display.

At step 107, the user assigns a trajectory to the selected icon. The trajectory is selected from a list of possible trajectories for that icon. The possible trajectories may include trajectories within a two dimensional horizontal plane around the user (2D trajectories) and trajectories within the three dimensional space around the user (3D trajectories). The trajectories each define a sequence of positions repeated to form a loop to continue for the duration of the entire MIDI file.

Once a trajectory has been assigned to a particular icon, the user interface shows which trajectory has been assigned to the icon. In addition, the appearance of the icon itself on the user interface changes. In this way, the user can immediately see which icons have been assigned trajectories and which have not i.e. which will move when the MIDI file is played and which will remain stationary.

It will be noted that "icon trajectory" and "instrument trajectory" will be used interchangeably in the specification but it should be understood that "icon trajectory" refers to the path of the icon relative to the user on the user interface, whereas "instrument trajectory" refers to the virtual path of the instrument relative to the user.

At step 109, the user has the option to play back the MIDI file to preview the soundscape with the new changes made at steps 103, 105 and 107.

Next, the logic moves to a decision block 111 where the user has the option to work with further icons. Thus, the user may assign new positions and trajectories to several or all the instruments within the file, previewing the effect each time by playing back the MIDI file. Once the user is satisfied that sufficient icons have been assigned a new position or trajectory, and the user is happy with the effect of those new positions/trajectories, the logic moves to step 113.

At step 113, the user has the option to save the file incorporating the changes he has made. Then the logic proceeds to a stop block.

FIGS. 2 to 5 illustrate exemplary user interface displays, in accordance with the steps illustrated in the flow diagram of FIG. 1, for an embodiment of the invention.

Figure 2:
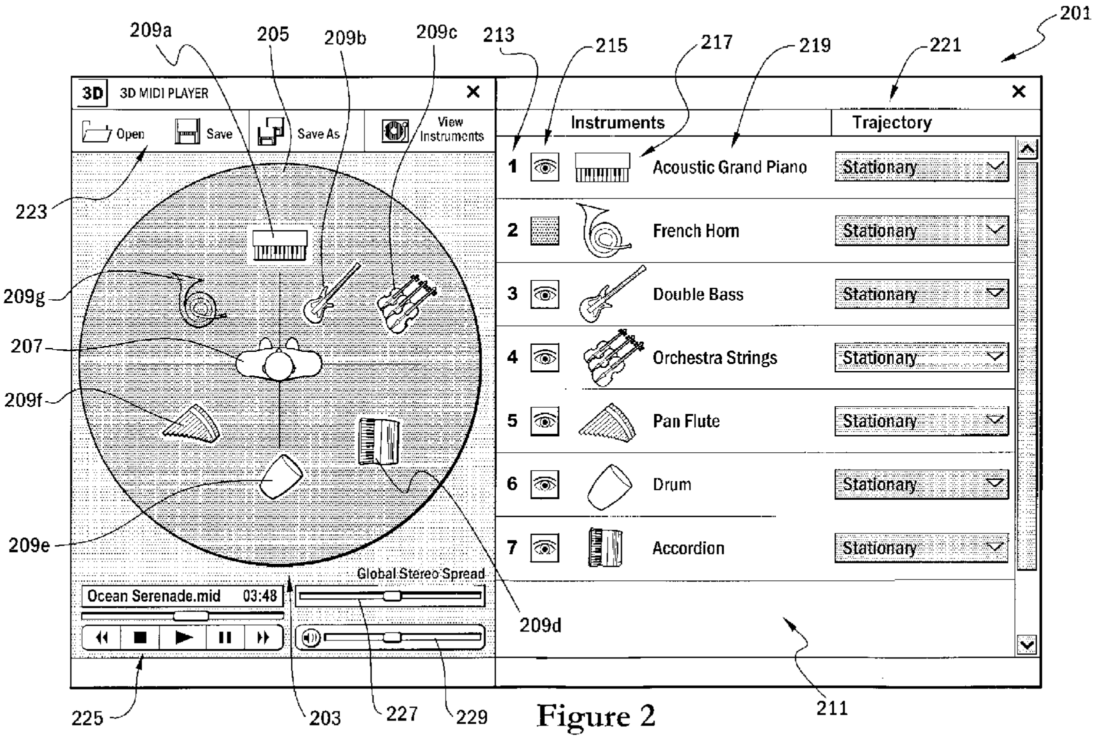
FIG. 2 is an exemplary user interface display for step 101 of FIG. 1.

FIG. 2 shows an exemplary user interface display 201 for MIDI file "Ocean Serenade" as it might appear when the MIDI file is opened (step 101 in FIG. 1). On the left-hand side of the user interface display 201 is a user representation 203. The user representation 203 is a virtual plan view of the user and shows a circular horizontal plane 205 surrounding the user 207 at the center. Seven icons 209*a* to 209*g* are shown surrounding the user (although it will, of course, be understood that any number of icons may be shown and this will depend on the particular MIDI file). The angular position of each icon represents the position from which the sound of that instrument or instruments will emanate when the MIDI file is played. The radial position of each icon (i.e. the distance from the user 207) represents the volume of that instrument or instruments (relative to the other instruments) when the MIDI file is played.

On the right-hand side of the user interface display 201 is an instruments pane 211.

Five columns are shown on the instruments pane 211. The first column 213 shows the icon number. The second column 215 shows the visibility checkboxes. The third column 217 shows the icons themselves. The fourth column 219 shows the instrument(s) that each icon represents and the fifth column 221 shows whether a trajectory has been assigned to that instrument.

The first column 213 simply shows the icon number. A number is assigned to each icon to simplify identification of the icon for the user.

The second column 215 shows the visibility check boxes. If the checkbox next to a particular icon is checked, an eye image appears in the checkbox. The eye indicates that the icon is clearly visible in the user representation 203. If the eye is unchecked, that icon becomes faint in the user representation 203. This is useful if there are many instruments in the MIDI file and, consequently, many icons in the user representation 203. The user may only be interested in some of those icons and can de-select the eye checkbox on the remaining icons to produce a less cluttered view on the user interface. In FIG. 2, we see that icons 209*a* to 209*f* are clearly visible (the eye checkbox is selected) and icon 209*g* is faint (the eye checkbox is de-selected).

The third column 217 simply shows the icons themselves as they appear in the user representation.

The fourth column 219 shows the instrument(s) that each icon represents. We see that icon 209*a* represents an acoustic grand piano, 209*b* represents a French horn, 209*c* represents a double bass, 209*d* represents an orchestra strings section, 209*e* represents a pan flute, 209*f* represents a drum and 209*g* represents an accordion.

The fifth column 221 shows whether a trajectory has been assigned to that icon. In FIG. 2, we see that all the icons 209*a* to 209*g* are “stationary” i.e. no trajectories have been assigned.

Other features on the user interface include a toolbar 223 including Open, Save, Save As and View Instruments buttons, a Progress Bar 225, a Global Stereo Spread Indicator 227 and a Volume Indicator 229.

Toolbar 223 allows a user to open a MIDI file (Open button), to save the opened MIDI file (Save button) or to save the opened MIDI file as a new file (Save As button). The View Instruments button on toolbar 223 opens and closes the instruments pane 211.

The Progress Bar 225 shows progress when the MIDI file is being played back. The Progress Bar also includes play, stop, forward and rewind buttons.

The Global Stereo Spread Indicator 227 controls the stereo spread of the MIDI file playback and the Volume Indicator 229 controls the master volume.

Figure 3:
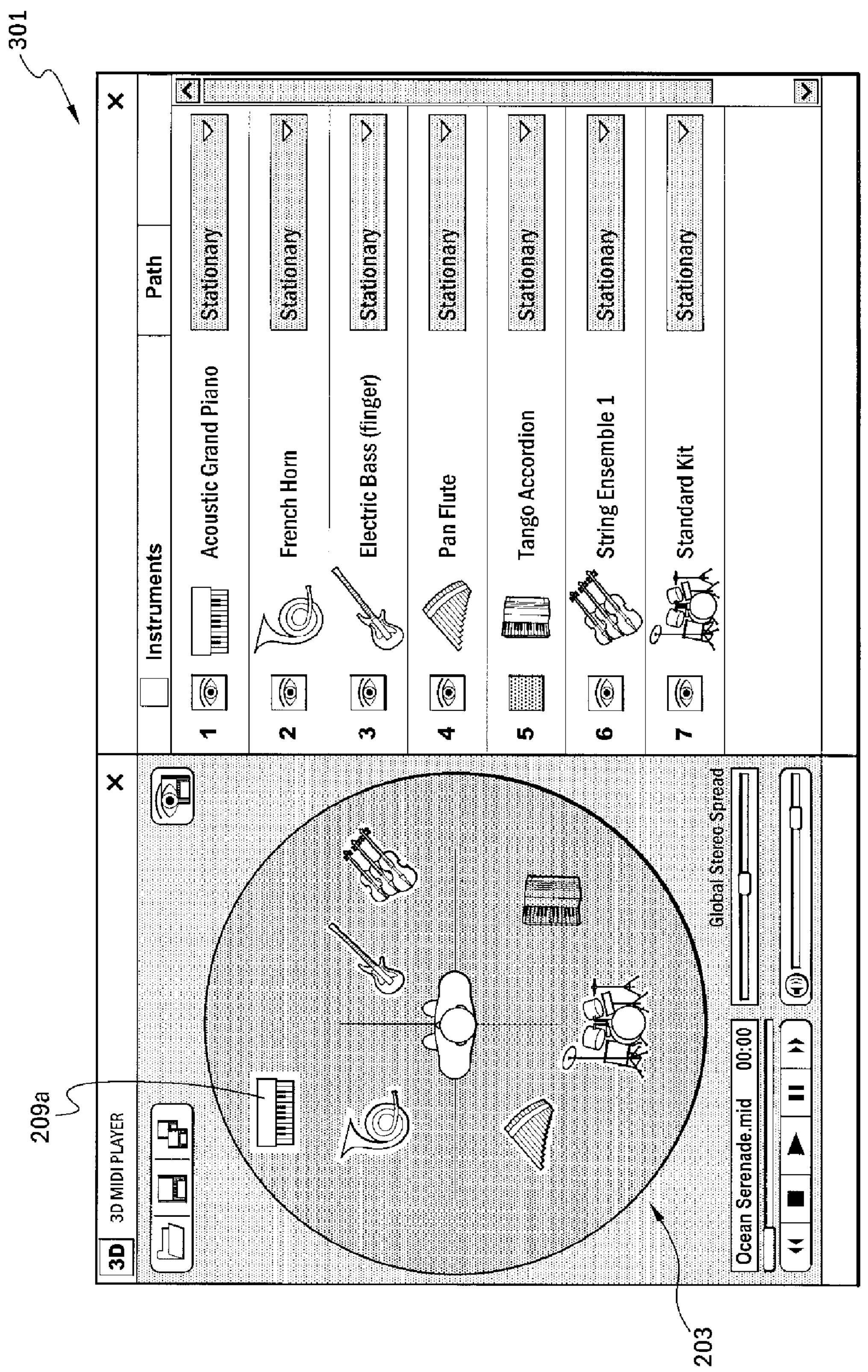
FIG. 3 is an exemplary user interface display for steps 103 and 105 of FIG. 1.

Referring to FIG. 1, we see that the user may select an icon and assign a new position to that icon (steps 103 and 105). FIG. 3 shows an exemplary user interface display 301, once a new position has been assigned to icon 209*a*.

Icon 209*a* (acoustic grand piano) now has a new angular position, so the sound of the acoustic grand piano will emanate from a different position when the MIDI file is played. Icon 209*a* also has a different radial position (it is further away from the user) so the sound of the acoustic grand piano will be quieter, relative to the other instruments, when the MIDI file is played.

Figure 4:
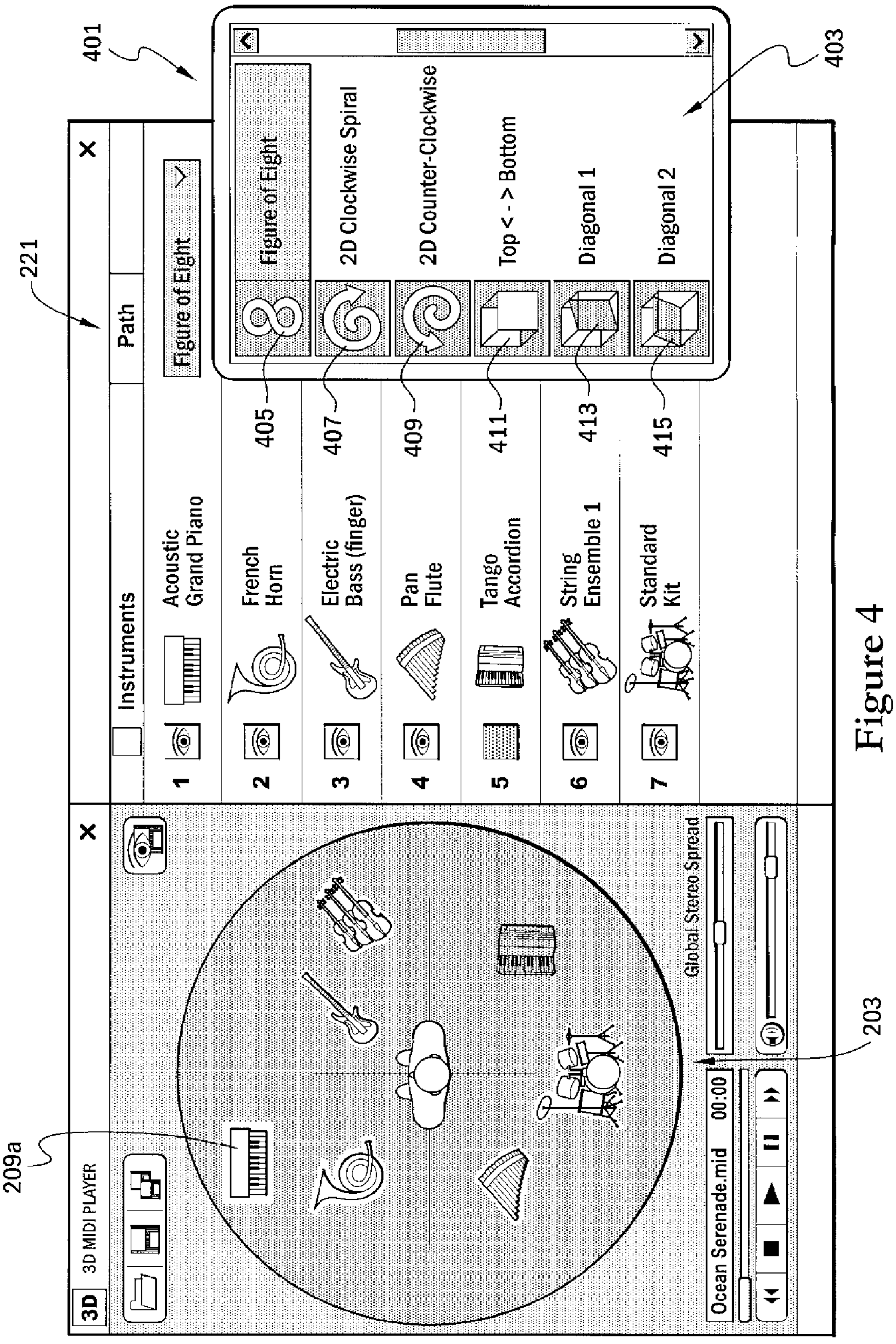
FIG. 4 is a first exemplary user interface display for step 107 of FIG. 1.

Referring to FIG. 1, we see that the user may assign a new trajectory to the selected icon (step 107). FIG. 4 shows an exemplary user interface display 401, when a trajectory is being assigned to icon 209*a*.

We see that, when the trajectory column 221 has been selected for icon 209*a*, a selection 403 of possible trajectories appears. In the example shown there are six possible trajectories: figure-of-eight movement 405, clockwise spiral movement 407, counter clockwise spiral movement 409, up and down movement 411 and diagonal movement 413 and 415 in two directions. Further trajectories are, of course, possible. These include (but are not restricted to) triangular movement and an arc moving from left to right or up and down.

As already mentioned, the trajectories define a sequence of positions repeated to form a loop. The limits of the sound source movements may be set by a simple distance parameter so that the size of the possible trajectories is controllable.

It will be seen that some of the trajectories (for instance trajectory 407) involve movement only in a horizontal plane around the user. These are 2D trajectories. Other trajectories involve movement in the three dimensional space around the user. These are 3D trajectories. This is discussed further below.

Figure 5:
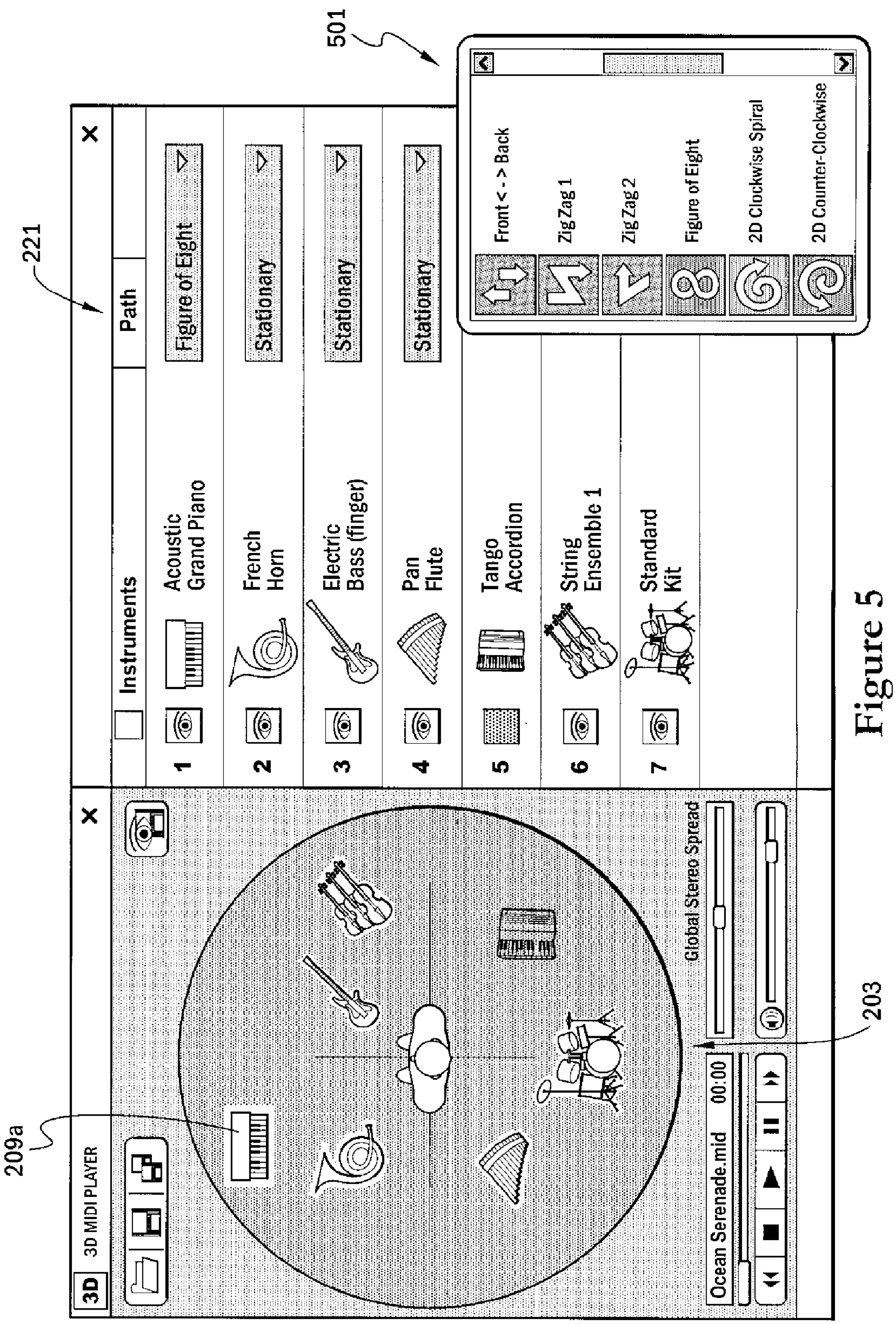
FIG. 5 is a second exemplary user interface display for step 107 of FIG. 1.

FIG. 5 shows an exemplary user interface display 501 once a trajectory has been assigned to icon 209*a*.

The trajectory selected (in this case the Figure-of-Eight trajectory) is shown in the trajectory column 221. In addition, icon 209*a* is now shown in green to indicate that a trajectory has been assigned to that icon. Thus, the user can see very quickly and easily which icons have been assigned trajectories and which have not.

Referring to FIG. 1, we see that the user may now preview the MIDI file, with the changes, by playing back the MIDI file. As the MIDI file is played back, the progress bar 225 shows progress of the file. In addition, those icons which have been assigned a trajectory will move in the user representation in accordance with their assigned trajectory as the MIDI file is played back. The sound of the instrument(s) associated with that icon will also appear to emanate from a moving location as the MIDI file is played back.

Once the user has previewed the file, he may opt to assign positions and trajectories to more icons (step 111 of FIG. 1). In order to do so, he repeats steps 103, 105, 107 and 109 for one or more further icons.

Once the user is happy with the MIDI file, he may use the “Save” or “Save As” option in the tool bar 223 to save the MIDI file. Once the MIDI file has been saved, using the Save or Save As button, the new trajectories/positions assigned to various icons are associated with that MIDI file. Therefore, when the MIDI file is next played back, the various changes that have been made, will be incorporated. The MIDI file may be next played back by the same user or may be next played back by another use who may be remote from the first user. For example, the first user may electronically send the new MIDI file to the second user. Thus, other users will be able to experience the new MIDI file soundscape.

It will be understood that the steps of FIG. 1 may vary in other embodiments. For example, the user may wish to save the changes to the MIDI file as he works on it, or he may wish to preview the soundscape more regularly.

Figure 6:
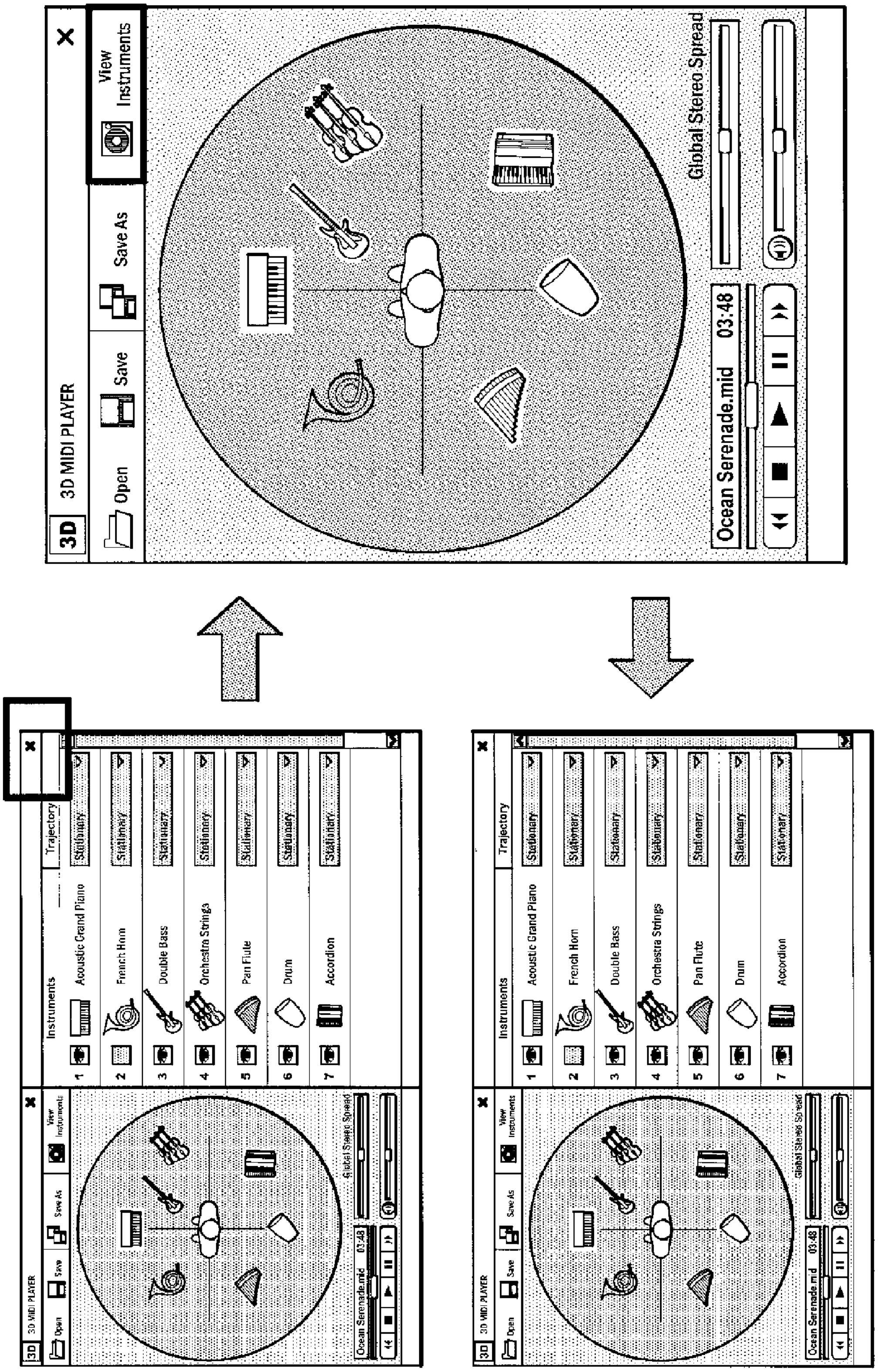
FIG. 6 is an exemplary user interface display showing how the user may work with several files at one time.

The user may wish to deal with several tracks at the same time. Therefore, the user interfaces are collapsible so that several can appear simultaneously. This is shown in FIG. 6.

The system is designed to be used by an individual user who wants to edit MIDI files at his own PC. Typically, the PC will be set up with one speaker on the user’s left and one speaker on the user’s right.

If a 2D trajectory is chosen, the icon moves accordingly in the user representation 203 (which shows the horizontal plane around the user) as the MIDI file is played back. Simultaneously, the sound of the instrument will appear to emanate from a moving location. This will be achieved by the two speakers on the user's left and right.

However, if a 3D trajectory is chosen, the icon moves accordingly on the user representation 203. However, user representation 203 simply shows a horizontal plane and it is necessary, for a 3D trajectory, to also show up and down movement (elevation) of the icon/instrument. This is achieved by showing a shadow around the icon, the shadow increasing or decreasing as the icon becomes further from or closer to the user. Simultaneously, the sound of the instrument will move in an up and down movement and this is achieved by the two speakers virtualising the elevation i.e. the horizontally spaced speakers imitate the elevational motion by virtualisation of the up and down sound.

When a trajectory is assigned to a particular instrument, the soundscape, as the MIDI file is played back, will be improved if the trajectory is timed to coordinate with the rhythm of the particular music of the MIDI file. If that is the case, the rhythm of the instrument/icon movement will be identical to that of the music or the instrument/icon will move in such a way that the two rhythms coordinate. Thus, the matching of the two rhythms will improve the listening experience for the user and will also provide a link between the music and the assigned trajectories.

For example, given a waltz rhythm together with a simple left and right alternating trajectory, the soundscape will be improved if the trajectory is timed with the waltz rhythm. One way to do that would be to arrange the trajectory so that the sound emanates from the left of the user on the first beat of the three-in-a-bar waltz timing and then from the right of the user on the next first beat of the three-in-a-bar waltz timing and so on. Alternatively, the sound could be arranged to oscillate between the left and right in time with every beat of the waltz rhythm.

It should be understood, however, that this is an example and many other rhythms can be envisaged. For example, the musical rhythm may be two- or four-in-a-bar. There may be several different trajectory rhythms possible for a given musical rhythm.

Thus, in one embodiment of the invention (not shown in the drawings), when the user selects the trajectory to be assigned to a particular icon, a selection of possible rhythms for that trajectory is displayed. (This may comprise a selection similar to that shown in FIG. 4, but of rhythms rather than trajectories.) The user may select his preferred rhythm, which will depend on the listening experience which he prefers. Alternatively, the trajectory rhythm may be set automatically when the trajectory is assigned in accordance with the rhythm of the music of the MIDI file.

The scope of the invention in creating new positions and/or trajectories using the user interface is intended to extend to amending both standard (legacy two dimensional) audio files and also to audio files already containing 3D parameters.

According the illustrated and described embodiment, in the process of amending an audio file, the user interface parameters are modified by manipulating an icon. That is, the user interface parameters are preferably updated or modified by movement of the icon on the user interface screen as described above. The modified user interface parameters are then mapped to and from parameters representative of the audio file (e.g., 3D MIDI parameters) using a driver for re-authoring the audio file. The driver may be configured to amend the audio file to place positioning information by any of a variety of methods. Without limiting the scope of the invention, one method for amending the audio file is described generally below.

The scope of the invention is intended to extend to audio files using any suitable coordinate system for representing the virtual positions of the instruments, for example, including either a spherical coordinate (listener centric) or Cartesian coordinate (speaker centric) system. In one embodiment, the driver is configured to read or write to or from an audio file representing the virtual positions of the instrument(s) in a spherical coordinate system.

Preferably, the user interface parameters include azimuth, distance, elevation, and pan spread factor parameters defined relative to a listener centric system having the listener deemed to be the origin. When amending standard MIDI files, a pan controller, designed for placing sounds between two stereo speakers, is available from the standard MIDI file. Since no values are generally available from a standard MIDI file for azimuth, elevation, distance, and pan spread, default values are taken for these. For example, default values of 0 degrees may be taken for elevation and azimuth and 100 percent for default distance and pan spread values. Standard MIDI assumes two stereo speakers taken at a default separation of 30 degrees left and right of the nominal axis from the listener to the arc provide the sound, hence the default value of 100% applies to this spread value.

The initial user interface parameters as modified by the user interface are then provided to the driver. The driver then converts the user interface parameters to the audio file parameters. The amended audio file parameters place the sound in virtual space by assuming that the MIDI pan controller positions the sounds along an arc, the arc vector from the listener position to the center of the arc defined by the elevation, azimuth, and distance values. The user interface pan spread value is used to define the spread of the arc and may be controlled from the user interface, in one embodiment, by adjusting the Global Stereo Spread Indicator 227 illustrated in FIG. 2. By using the pan spread parameter, the arc may be made wider or narrower. This arc may be visualized as the arc between the 2 virtual speakers, i.e., between the left reference position and the right reference position. The re-authored audio file in one embodiment uses a pan roll angle parameter to specify the rotation of the arc about the vector from the listener position to the center of the arc.

Representing the icon's position on the display in terms of the user interface parameters azimuth angle, elevation angle, and distance relative to this origin is a trivial step readily understood by those of skill in the relevant arts and thus complete details will not be provided here. For example, a horizontal distance to the icon along a nominal axis (e.g., x-axis) and a horizontal distance along a perpendicular y-axis (in the same horizontal plane) may be used in conjunction with well known trigonometric functions to determine the distance in the horizontal plane to the icon as well as an azimuth angle to the icon. In similar fashion, the elevation angle to the icon may be determined from a distance in the horizontal plane and a distance in the vertical plane, for example by using the arc tan function.

These user interface parameters for the icon position may than be mapped by the driver to the parameters for the audio file, for example to new parameters or controllers for a MIDI file. Those skilled in the relevant arts and particularly those familiar with legacy MIDI formats will appreciate that the values for many MIDI parameters and controllers may be designated using two data bytes, i.e. a "coarse" byte (MSB) and a fine byte (LSB), thus providing fine resolution for these parameters. Further, associating the data bytes with a type of controller or parameter may be effectuated through the use of a status byte assigning a particular number to the controller. As known to those of skill in the relevant arts, header information received in MIDI messages often includes a controller number, some registered (defined in the MIDI specification) and some non-registered.

In one embodiment, rather than specifying the distance to the arc directly from the user interface distance parameter, distance and attenuation parameters in the MIDI file are set by a combination of five different parameters: maximum distance, gain at maximum distance, reference distance ratio, distance ratio, and gain.

Suitably configured decoding equipment may perform the virtual positioning of the sound sources based on the reading of the content of the re-authored audio files. Preferably, the rendering equipment accepts the saved file with the modified data and renders the corresponding audio in the most compelling manner using any speaker layout or CODEC available, thus using the full capabilities of the playback system. The virtual position defined by the user interface is preferably used to determine the 3D MIDI parameters stored in the re-authored audio file. From these parameters, stored with the 3D MIDI file and associated with the 3D controller, a sound-rendering device is able to appropriately position the virtual source. Initially, the arc is defined by the pan spread value and the pan value. In order to finally position the virtual source in space, azimuth and elevation values, followed by a rotation of the roll value are used as well as the distance parameters.

While the use of 3D positional and trajectory information with stereo speakers is illustrative, the invention is not so limited. The scope of the present invention is intended to extend to the 3D spatial positioning of a sound source with any of a variety of sound speakers or systems, i.e., to enable the audio files to be played back with any speaker system or 3D synthesizer. For example, the 3D MIDI stream derived from a saved 3D MIDI file may be used with 4.1 systems, 5.1 systems, 6.1 systems, headphones, etc. Further, the scope of the invention is intended to extend to the re-authored file storing the virtual position associated with an instrument by other suitable methods, to include directly defining the Cartesian coordinates of the virtual position in the amended file.

While the preferred embodiment of the invention has been illustrated and described, it will be appreciated that various changes can be made therein without departing from the spirit and scope of the invention as defined by the appended claims.

What is claimed is:

1. A method for enabling a user to amend an audio file, via a user interface for controlling a driver for re-authoring the audio file, the method comprising the steps of:

a) associating an icon on said user interface with one or more instruments or sets of instruments in said audio file;

b) providing a selection of possible predefined trajectories for each said icon, each trajectory defining the virtual audio movement path, relative to said user, of the associated instrument or set of instruments;

c) providing a display on said user interface for showing the position of each said icon, each position defining the virtual position, relative to said user, of the associated instrument or set of instruments;

d) the user selecting an icon;

e) the user assigning a position and/or a trajectory from the selection, to the selected icon; and f) indicating, on said display, the position of the selected icon and whether a trajectory has been assigned to the selected icon, so as to provide the user with a visual overview of the audio file's amended soundscape, wherein the virtual audio movement of each possible predefined trajectories for selection moves in a rhythm which matches the rhythm of music of the audio file.

2. A method according to claim 1 wherein the display on said user interface shows a virtual view of the user and the user's surroundings.

3. A method according to claim 2 wherein the step of indicating the position of the selected icon comprises displaying the position of the icon in the user's surroundings on the virtual view.

4. A method according to claim 2 wherein the virtual view shows a virtual plan view of the user and a two dimensional horizontal plane around the user.

5. A method according to claim 2 wherein the virtual view shows a virtual perspective view of the user and a three dimensional space around the user.

6. A method according to claim 2 wherein the step of the user assigning a position to the selected icon comprises the user moving the selected icon in the user's surroundings on the virtual view.

7. A method according to claim 1 further comprising the step of showing on the user interface the instrument or instruments associated with each icon.

8. A method according to claim 1 further comprising the step of showing the trajectory, if any, assigned to each icon.

9. A method according to claim 1 wherein the icon or icons which have been assigned a trajectory have a different visual appearance from icons which have not been assigned a trajectory.

10. A method according to claim 9 wherein the icon or icons which have been assigned a trajectory are shown with a coloured glow.

11. A method according to claim 1 wherein the selection of possible trajectories includes one or more of:

left and right motion;
up and down motion;
figure-of-eight motion;
zig zag motion;
spiral motion; and
arcuate motion.

12. A method according to claim 1 wherein the audio file is a MIDI file.

13. Apparatus for enabling a user to amend an audio file, the apparatus comprising a user interface for controlling a driver for re-authoring the audio file, the user interface comprising:

a) at least one icon, the or each icon being associated with one or more instruments or sets of instruments in said audio file;

b) a selection of possible predefined trajectories for each icon, each trajectory defining the virtual audio movement path, relative to the user, of the associated instrument or set of instruments;

c) a display on said user interface, the display arranged to provide the user with a visual overview of the audio file's amended soundscape by showing i) the position of each icon, each position defining the virtual position, relative to the user, of the associated instrument or set of instruments; and ii) whether a trajectory has been assigned to the selected icon;

wherein the virtual audio movement of each possible predefined trajectories for selection moves in a rhythm which matches the rhythm of the music of the audio file.

14. Apparatus according to claim 13 wherein the display on said user interface comprises a virtual view of the user and the user's surroundings.

15. Apparatus according to claim 14 wherein the display shows the position of each icon by displaying the position of the icon in the user's surroundings on the virtual view.

16. Apparatus according to claim 14 wherein the virtual view shows a virtual plan view of the user and a two dimensional horizontal plane around the user.

17. Apparatus according to claim 14 wherein the virtual view shows a virtual perspective view of the user and a three dimensional space around the user.

18. Apparatus according to claim 13 wherein the display shows the trajectory, if any, assigned to each icon.

19. Apparatus according to claim 13 wherein the icon or icons which have been assigned a trajectory have a different visual appearance from icons which have not been assigned a trajectory.

20. Apparatus according to claim 19 wherein the icon or icons which have been assigned a trajectory are shown with a coloured glow.

21. Apparatus according to claim 13 wherein the selection of possible trajectories includes one or more of:

left and right motion;

up and down motion;

figure-of-eight motion;

zig zag motion;

spiral motion; and arcuate motion.

* * * * *